United States Patent
Boyd et al.

(10) Patent No.: US 11,593,462 B2
(45) Date of Patent: Feb. 28, 2023

(54) BASEBOARD MANAGEMENT CONTROLLER FIRMWARE SECURITY SYSTEM

(71) Applicant: Dell Products L.P., Round Rock, TX (US)

(72) Inventors: Patrick Oliver Boyd, Austin, TX (US); Marshal F. Savage, Austin, TX (US); Eugene David Cho, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 17/167,845

(22) Filed: Feb. 4, 2021

(65) Prior Publication Data

US 2022/0245222 A1 Aug. 4, 2022

(51) Int. Cl.
*G06F 9/4401* (2018.01)
*G06F 21/10* (2013.01)
*G06F 21/12* (2013.01)

(52) U.S. Cl.
CPC .......... *G06F 21/12* (2013.01); *G06F 9/4401* (2013.01); *G06F 21/105* (2013.01); *G06F 2221/0735* (2013.01)

(58) Field of Classification Search
None
See application file for complete search history.

(56) References Cited

U.S. PATENT DOCUMENTS

| | | | |
|---|---|---|---|
| 2015/0143163 A1* | 5/2015 | Dasari | G06F 21/00 714/6.3 |
| 2016/0203302 A1* | 7/2016 | Huscroft | G06F 21/105 726/29 |
| 2019/0095593 A1* | 3/2019 | Cisneros | H04L 9/30 |
| 2021/0064734 A1* | 3/2021 | Chen | G06F 21/575 |

\* cited by examiner

*Primary Examiner* — Fahmida Rahman
(74) *Attorney, Agent, or Firm* — Joseph Mencher

(57) ABSTRACT

A BMC firmware security system includes a BMC coupled to a programmable circuit device and a first storage subsystem. In response to BMC initialization, the BMC uses a system identifier to verify that a license in the first storage subsystem authorizes the BMC to use BMC firmware in the BMC, uses branding identity information in the BMC to verify that the BMC is branded for the BMC firmware, determines that the programmable circuit device identifies the BMC firmware and, in response, the performs BMC initialization operations using the BMC firmware. A BIOS is coupled to the programmable circuit device and a second storage system. In response to BIOS initialization, the BIOS uses the branding identity information in the second storage subsystem to identify the BMC firmware, determines that the programmable circuit device identifies the BMC firmware and, in response, performs BIOS initialization operations.

20 Claims, 13 Drawing Sheets

BASEBOARD MANAGEMENT CONTROLLER FIRMWARE SECURITY SYSTEM

BACKGROUND

The present disclosure relates generally to information handling systems, and more particularly to providing for the secure use of Baseboard Management Controller (BMC) firmware in BMC devices included in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, are sometimes provided with Baseboard Management Controller devices (BMC devices) that operate to manage an interface between system management software and platform hardware, monitor server device parameters (e.g., temperature, fan speeds, power information, operating system status, and/or other parameters known in the art), send alerts based on the monitored server device parameters, enable remote management of the server device, and/or perform a variety of other BMC functionality known in the art. Furthermore, BMC devices may be configured using different BMC firmware in order to enable different BMC functionality, and server device manufacturers may configure BMC devices in particular server devices with particular BMC firmware in order to provide particular BMC functionality and security.

For example, in server devices that are part of the POWEREDGE® server platform available from DELL® Inc. of Round Rock, Tex., United States, BMC devices may be configured (by default) with integrated Remote Access Controller (iDRAC®) firmware to provide the BMC device as an "iDRAC" that includes particular BMC functionality and security, and most users utilize their server devices/BMC devices with the default configuration. However, some users may wish to provide modified or custom BMC firmware on the BMC devices in their server devices, and doing so will change the BMC functionality and security of that BMC device/server device. As such, server device/BMC device vendors are presented with the issue of how to provide secure server devices/BMC devices that a majority of their users can trust, while also allowing some users to configure their server devices/BMC devices in a custom manner (e.g., that may limit the BMC functionality and security) without negatively effecting the reputation of the corresponding server platform.

Accordingly, it would be desirable to provide a BMC firmware security system that addresses the issues discussed above.

SUMMARY

According to one embodiment, an Information Handling System (IHS) includes a Baseboard Management Controller (BMC) processing system; and a BMC memory system that is coupled to the BMC processing system and that includes instructions that, when executed by the BMC processing system, cause the BMC processing system to provide a BMC engine that is configured, in response to a current BMC initialization of the BMC engine, to: verify, using a system identifier, that a license stored in a first storage subsystem authorizes the BMC engine to use BMC firmware; verify, using branding identity information stored in a BMC storage subsystem, that the BMC engine is branded for the BMC firmware; determine that a programmable circuit device has been programmed to identify the BMC firmware; and perform BMC initialization operations using the BMC firmware in response to verifying that the license authorizes the BMC engine to use BMC firmware, verifying that the BMC engine is branded for the BMC firmware, and determining that the programmable circuit device has been programmed to identify the BMC firmware.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
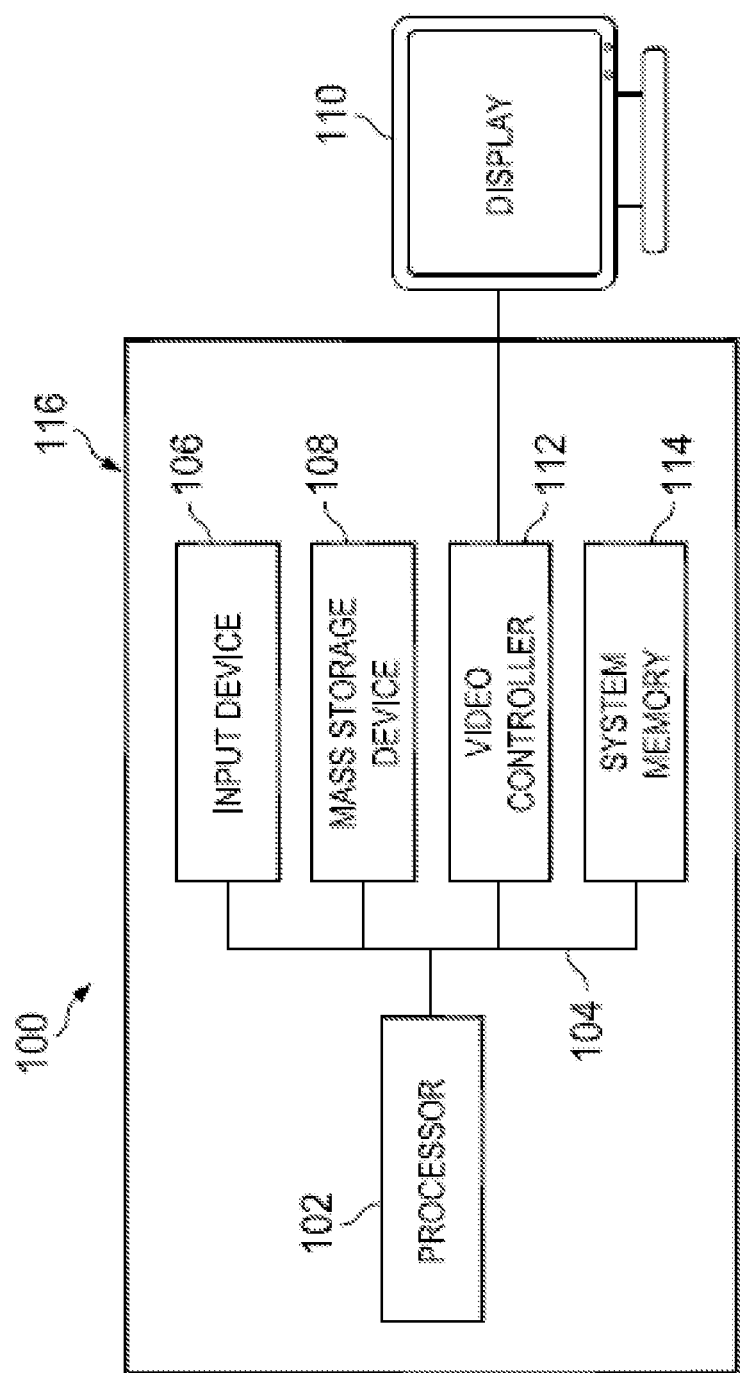
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
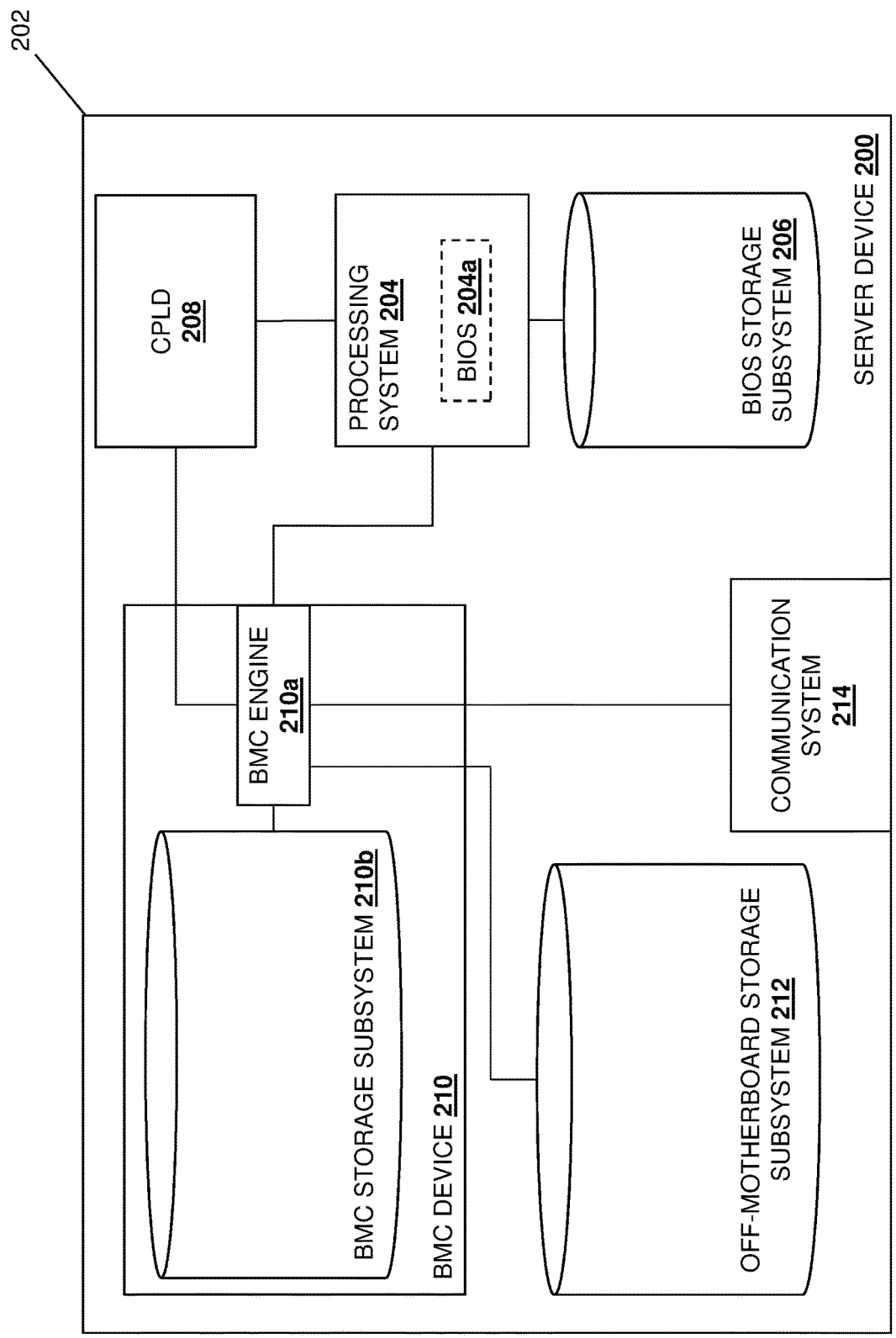
FIG. 2 is a schematic view illustrating an embodiment of a server device that may utilize the BMC firmware security system of the present disclosure.

Referring now to FIG. 2, an embodiment of a server device 200 is illustrated that may utilize the BMC firmware security system of the present disclosure. In the illustrated embodiment, the server device 200 may be provided by the IHS 100 discussed above with reference to FIG. 1, and/or may include some or all of the components of the IHS 100. However, while illustrated and discussed as being provided by a server device, one of skill in the art in possession of the present disclosure will recognize that the BMC firmware security system of the present disclosure may be provided in a variety of computing devices that may be configured to operate similarly as the server device discussed below. In the illustrated embodiment, the server device 200 includes a chassis 202 that houses the components of the server device 200, only some of which are illustrated and discussed below. For example, the chassis 202 may house a processing system 204 (e.g., which may include the processor 102 discussed above with reference to FIG. 1) that may be coupled to a memory system (not illustrated, but which may include the memory 114 discussed above with reference to FIG. 1) that includes instructions that, when executed by the processing system 204, cause the processing system to provide a Basic Input/Output System (BIOS) 204a that is configured to perform the functionality of the BIOS and/or server devices discussed below.

As would be understood by one of skill in the art in possession of the present disclosure, the BIOS 204a may be provided by firmware and may be used to perform hardware initialization for the server device 200 during BIOS initialization operations (discussed in further detail below), as well as provide runtime services for operating systems and/or applications provided on the server device 200. Furthermore, while described as a "BIOS", one of skill in the art in possession of the present disclosure will recognize that the BIOS 204a may be provided according to the Universal Extensible Firmware Interface (UEFI) specification that defines a software interface between an operating system in the server device 200 and platform firmware in the server device 200, and that has been provided to replace legacy BIOS firmware.

The chassis 302 may also house a BIOS storage subsystem 206 that is coupled to the BIOS 204a (e.g., via a coupling between the BIOS storage subsystem 206 and the processing system 204) and that, in specific embodiments, may be provided by a BIOS Serial Peripheral Interface (SPI) flash memory device that is configured to store the branding identity information discussed in further detail below, although one of skill in the art in possession of the present disclosure will recognize that other storage devices/subsystems will fall within the scope of the present disclosure as well. The chassis 302 may also house a programmable circuit device such as the Complex Programmable Logic Device (CPLD) 208 that is coupled to the BIOS 204a (e.g., via a coupling between the CPLD 208 and the processing system 204), and one of skill in the art in possession of the present disclosure will recognize that a variety of programmable devices/subsystems may provide the CPLD 208 illustrated in FIG. 2 (e.g., a Field Programmable Gate Array (FPGA), etc.) while remaining within the scope of the present disclosure.

The chassis 302 may also house a Baseboard Management Controller (BMC) device 210 that, in the embodiments illustrated and discussed below, may include a BMC processing system (not illustrated, but which may include the processor 102 discussed above with reference to FIG. 1) and a BMC memory system (not illustrated, but which may include the memory 114 discussed above with reference to FIG. 1) that includes instructions that, when executed by the BMC processing system, cause the BMC processing system to provide a BMC engine 210a that is configured to perform the functionality of the BMC engines and/or BMC devices discussed below. In specific examples discussed below, the BMC engine 210a is configured to provide a universal boot loader ("U-boot") subsystem, although one of skill in the art in possession of the present disclosure will appreciate that the BMC engine 210a may provide other subsystems for performing the functionality discussed below while remaining within the scope of the present disclosure as well. As illustrated, the BMC engine 210a may be coupled to the CPLD 208 (e.g., via a coupling between the CPLD 208 and the BMC processing system) and the BIOS 204a (e.g., via a coupling between the processing system 204 and the BMC processing system). Furthermore, the BMC device 210 also includes a BMC storage subsystem 210b that is coupled to the BMC engine 210a (e.g., via a coupling between the BMC storage subsystem 210b and the BMC processing system), and that is configured to store the branding identity information and BMC firmware discussed in further detail below.

The chassis 302 may also house an off-motherboard storage subsystem 212 that is coupled to the BMC engine 210a (e.g., via a coupling between the off-motherboard storage subsystem 212 and the BMC processing system) and that, in specific embodiments, may be provided by an off-motherboard Serial Peripheral Interface (SPI) flash memory device that is configured to store the branding identity information and license discussed in further detail below, although one of skill in the art in possession of the present disclosure will recognize that other storage devices/ subsystems will fall within the scope of the present disclosure as well. Furthermore, while described as "off-motherboard" to all the storage subsystem 212 to provide for the part/BMC replacement scenarios described in further detail below, one of skill in the art in possession of the present disclosure will recognize that some embodiments may provide the storage system 212 on the same motherboard as the BMC device 210 (or a circuit board coupled to the BMC device 210) while remaining within the scope of the present disclosure as well.

The chassis 302 may also house a communication system 214 that is coupled to the BMC engine 210a (e.g., via a coupling between the communication system 214 and the BMC processing system), and that may be provided by a Network Interface Controller (NIC), wireless communication subsystems such as BLUETOOTH® communication subsystems, Near Field Communication (NFC) subsystems, WiFi subsystems, and/or other wireless subsystems known in the art, and/or any other communication components that would be apparent to one of skill in the art in possession of the present disclosure. However, while a specific server device 200 has been illustrated and described, one of skill in the art in possession of the present disclosure will recognize that server devices (or other devices operating according to the teachings of the present disclosure in a manner similar to that described below for the server device 200) may include a variety of components and/or component configurations for providing conventional server device functionality, as well as the functionality discussed below, while remaining within the scope of the present disclosure as well.

Figure 3:
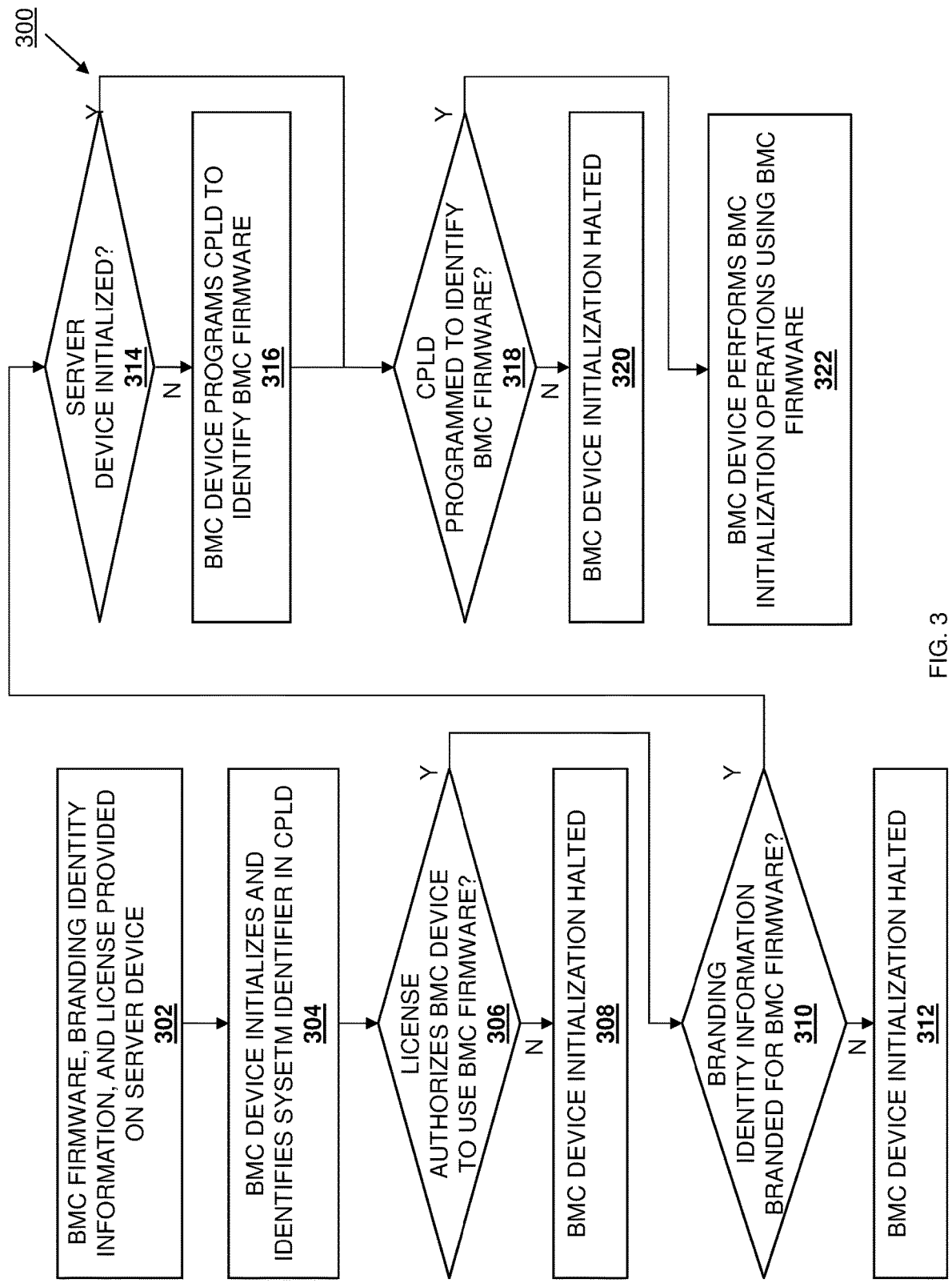
FIG. 3 is a flow chart illustrating an embodiment of a method for securing BMC firmware.

Referring now to FIG. 3, an embodiment of a method 300 for securing BMC firmware is illustrated. As discussed below, the systems and methods of the present disclosure provide for the establishment of a "circle of trust" between a BMC device, a CPLD, and a processing system in a server device in order to enable the secure utilization of different BMC firmware by the BMC device. For example, the BMC firmware security system of the present disclosure may include a BMC coupled to a CPLD and a first storage subsystem. In response to BMC initialization, the BMC uses a system identifier to verify that a license in the first storage subsystem authorizes the BMC to use BMC firmware in the BMC, uses branding identity information in the BMC to verify that the BMC is branded for the BMC firmware, determines that the CPLD identifies the BMC firmware and, in response, performs BMC initialization operations using the BMC firmware. As such, the BMC device may utilize different BMC firmware without running afoul of security requirements for the server device.

The method 300 begins at block 302 where BMC firmware, branding identity information, and a license are provided on a server device. As discussed below, the BMC device 210 in the server device 200 may be configurable with different BMC firmware that provides different BMC functionality and/or security, and in the specific examples provided below the server device 200 is provided by DELL® Inc. of Round Rock, Tex., United States, with the BMC device 200 configurable with "iDRAC" firmware that is developed and signed by DELL® Inc. and provides a first level of functionality and/or security (e.g., "iDRAC" functionality and/or security), "OpenBMC" firmware that is developed and signed by DELL® Inc. and provides a second level of functionality and/or security (e.g., "OPenBMC" or "OpenBMC+" functionality and/or security) that is relatively less than the first level of functionality and/or security, and "Do-It-Yourself (DIY) OpenBMC" firmware that is developed by a user of the server device and provides a third level of functionality and/or security (e.g., "DIY OpenBMC" or "DIY OpenBMC+" functionality and/or security) that is custom and may be different than the first level of functionality and/or security and the second level of functionality and/or security. However, while specific examples of different BMC firmware are described above, one of skill in the art in possession of the present disclosure will appreciate that other BMC firmware will fall within the scope of the present disclosure as well.

Figure 4:
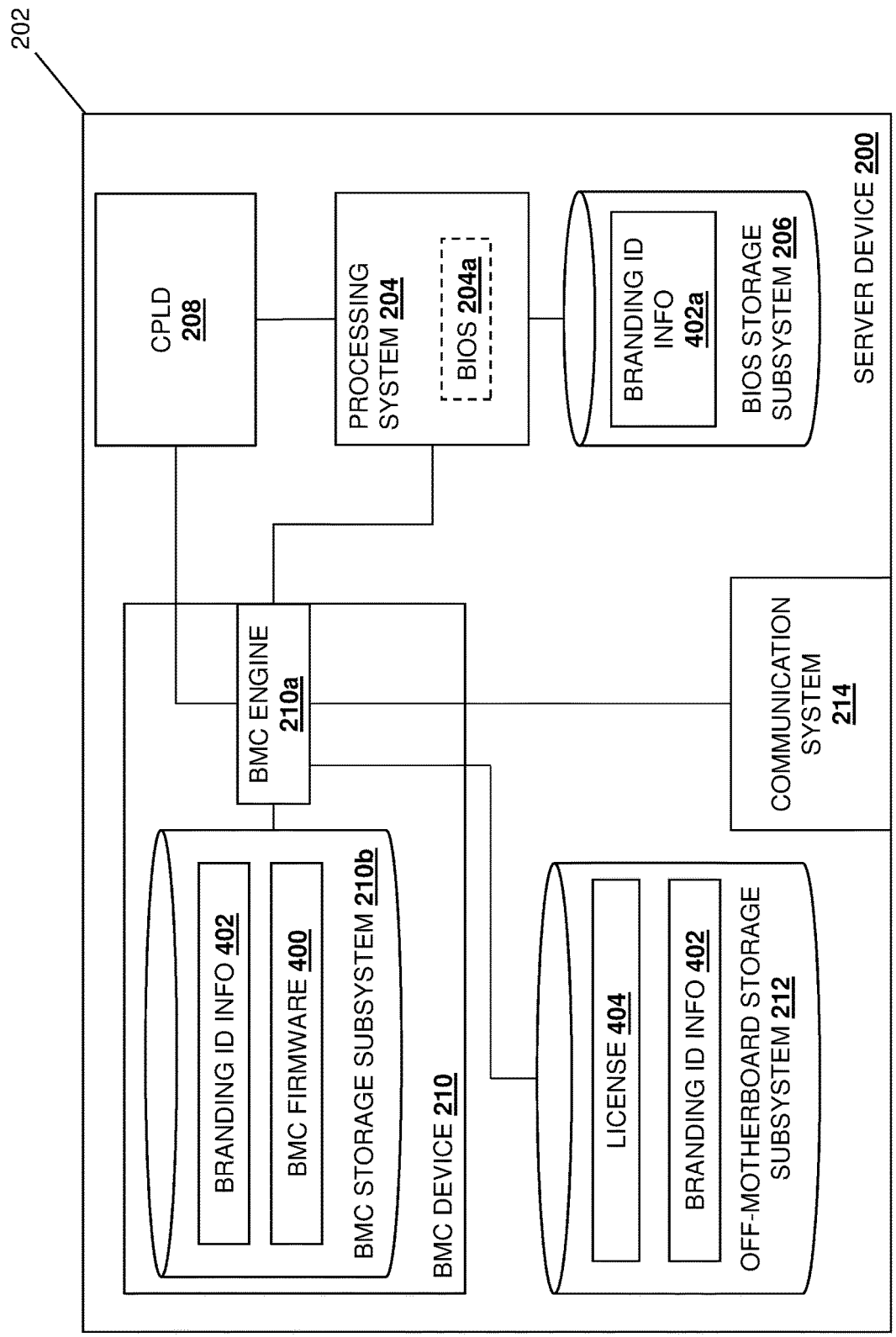
FIG. 4 is a schematic view illustrating an embodiment of the server device of FIG. 2 operating during the method of FIG. 3.

With reference to FIG. 4, in an embodiment of block 302, BMC firmware 400 may be provided in the BMC storage subsystem 210b in the BMC device 210, branding identity information 402 for the BMC firmware 400 may be provided in the BMC storage subsystem 210b in the BMC device 210 as well as in the off-motherboard storage subsystem 212, a branding identity information subset 402a of the branding identity information 402 for the BMC firmware 400 may be provided in the BIOS storage subsystem 206, and a license 404 for the BMC firmware 400 may be provided in the off-motherboard storage subsystem 212. As will be appreciated by one of skill in the art in possession of the present disclosure, the branding identity information 402 stored in the off-motherboard storage subsystem 212 is not utilized during the method 300 as described herein, and is provided for component/part replacement scenarios in the server device 200. For example, in the event a motherboard in the server device 200 that includes the BMC device 210 were replaced, one of skill in the art in possession of the present disclosure would appreciate from the discussion below how the branding identity information 402 and the license 404 stored in the off-motherboard storage subsystem 212 would allow, when a new motherboard and new BMC device are provided in the server device 200, for the secure provisioning of BMC firmware on that new BMC device (e.g., by ensuring licensing/authorization of that BMC firmware using the license 404, and proper branding for that BMC firmware using the branding identity information 402, as discussed in further detail below).

Continuing with the specific example above, the server device 200 may be manufactured by DELL® Inc. with the "iDRAC" firmware that is discussed above and that may be provided as a default for use in configuring the BMC device 210 to operate as an "iDRAC" and, as such, the "iDRAC" firmware/BMC firmware 400 may be provided in the BMC storage subsystem 210b in the BMC device 210, the branding identity information 402 for the "iDRAC" firmware may be provided in the BMC storage subsystem 210b in the BMC device 210 as well as in the off-motherboard storage subsystem 212, the branding identity information subset 402a of the branding identity information 402 for the "iDRAC" firmware may be provided in the BIOS storage subsystem 206, and a license 404 for the "iDRAC" firmware may be provided in the off-motherboard storage subsystem 212.

Furthermore, the branding identity information 402 may be configured to brand the BMC device 210 that has been configured with the "iDRAC" firmware as an "iDRAC", as well as brand the server device 200 that includes that BMC device 210 as part of a "POWEREDGE" server platform. For example, one of skill in the art in possession of the present disclosure will appreciate how the branding identity information 402 may provide for the use of particular system name strings (e.g., "iDRAC", "POWEREDGE", etc.), particular graphics (e.g., "iDRAC" graphics, "POWEREDGE" graphics, etc.), and/or a variety of other particular branding features that are specific to (and that identify) the "iDRAC" and "POWEREDGE" server platform in this example. As such, the server device 200 may be provided to users with the BMC device 210 configured to operate (and branded) as an "iDRAC", and the server device 200 branded as part of a "POWEREDGE" server platform.

However, continuing with the specific example below, the "OpenBMC" firmware or "DIY OpenBMC" firmware discussed above may be provided for use in reconfiguring the BMC device 210 from its default operation as an "iDRAC" to operating as an "OpenBMC" device or "DIY OpenBMC" device and, as such, the "OpenBMC" firmware/"DIY OpenBMC" firmware/BMC firmware 400 may be provided in the BMC storage subsystem 210b in the BMC device 210, the branding identity information 402 for the "OpenBMC" firmware/"DIY OpenBMC" firmware may be provided in the BMC storage subsystem 210b in the BMC device 210 as well as in the off-motherboard storage subsystem 212, the branding identity information subset 402a of the branding identity information 402 for the "OpenBMC" firmware/ "DIY OpenBMC" firmware may be provided in the BIOS storage subsystem 206, and a license 404 for the "OpenBMC" firmware/"DIY OpenBMC" firmware may be provided in the off-motherboard storage subsystem 212.

Furthermore, the branding identity information 402 may be configured to brand the BMC device 210 that has been configured with the "OpenBMC" firmware/"DIY OpenBMC" firmware as an "OpenBMC"/"DIY OpenBMC" device, as well as brand the server device 200 that includes that BMC device 210 as part of a "Cloud Service Provider (CSP)" server platform. For example, one of skill in the art in possession of the present disclosure will appreciate how the branding identity information 402 may provide for the use of particular system name strings (e.g., "OpenBMC"/ "DIY OpenBMC", "CSP", etc.), particular graphics (e.g., "OpenBMC"/"DIY OpenBMC" graphics, "CSP" graphics, etc.), and/or a variety of other particular branding features that are specific to (and that identify) the "OpenBMC"/"DIY OpenBMC" and "CSP" server platform in this example. As such, the server device 200 may be modified from a default configuration to configure the BMC device 210 to operate (and be branded) as an "OpenBMC"/"DIY OpenBMC" device, and the server device 200 branded as part of a "CSP" server platform.

However, while specific BMC firmware has been described as providing a default configuration for the BMC device and subsequent reconfigured configurations for the BMC device, one of skill in the art in possession of the present disclosure will appreciate that BMC device may be configured with other default BMC firmware and reconfigured with other BMC firmware while remaining within the scope of the present disclosure as well. In other words, continuing with the specific example above, the server device 200 may be manufactured by DELL® Inc. with the "OpenBMC" firmware or "DIY OpenBMC" firmware provided as a default for use in configuring the BMC device 210 to operate as an "OpenBMC"/"DIY OpenBMC" device, and the "iDRAC" firmware provided for use in reconfiguring the BMC device 210 to operate as an "iDRAC".

Furthermore, one of skill in the art in possession of the present disclosure will recognize that any BMC firmware and associated branding identity information and license may be provided on the server device 200 in a secure manner. In some embodiments, BMC firmware, branding identity information, and licenses may each be signed with a private key and verified with a public key. Continuing with the example in which the "iDRAC" firmware or "OpenBMC" firmware is provided for the server device 200/BMC device 210 by DELL® Inc., the "iDRAC" firmware or "OpenBMC" firmware, corresponding branding identity information, and corresponding license may all be signed with respective private keys controlled by DELL® Inc., and the BMC engine 210a in the BMC device 210 may have access to corresponding public keys that it may use to validate those private key signatures.

Furthermore, continuing with the example in which the "DIY OpenBMC" firmware is provided for configuration of the server device 200/BMC device 210, the "DIY OpenBMC" firmware may be signed with a private key controlled by the user, while corresponding branding identity information and a corresponding license may be signed with respective private keys controlled by DELL® Inc., and the BMC engine 210a in the BMC device 210 may have access to corresponding public keys that it may use to validate the private key signatures on the branding identity information and the license, while also being able to extract a public key from the license (e.g., provided by the user to DELL® Inc. and subsequently embedded in the license) to verify the private key signature on the "DIY OpenBMC" firmware. As such, one of skill in the art in possession of the present disclosure will appreciate how the BMC firmware/ branding identity information/license combination may be provided on the server device 200 during manufacture and subsequently authenticated, or may be provided to the BMC engine 210a (e.g., via a network and the communication system 214), authenticated, and then provided on the server device 200. Thus, any BMC firmware update may be checked against a corresponding license to ensure only BMC firmware supported by a corresponding license is used to configure the BMC device (described in further detail below), and one of skill in the art in possession of the present disclosure will recognize how licenses may be specific to server devices in order to, for example, prevent fraudulent license acquisition and the application of such fraudulent licenses to a server device that was not intended to utilize a BMC configured with relatively less secure BMC firmware.

Figure 5A:
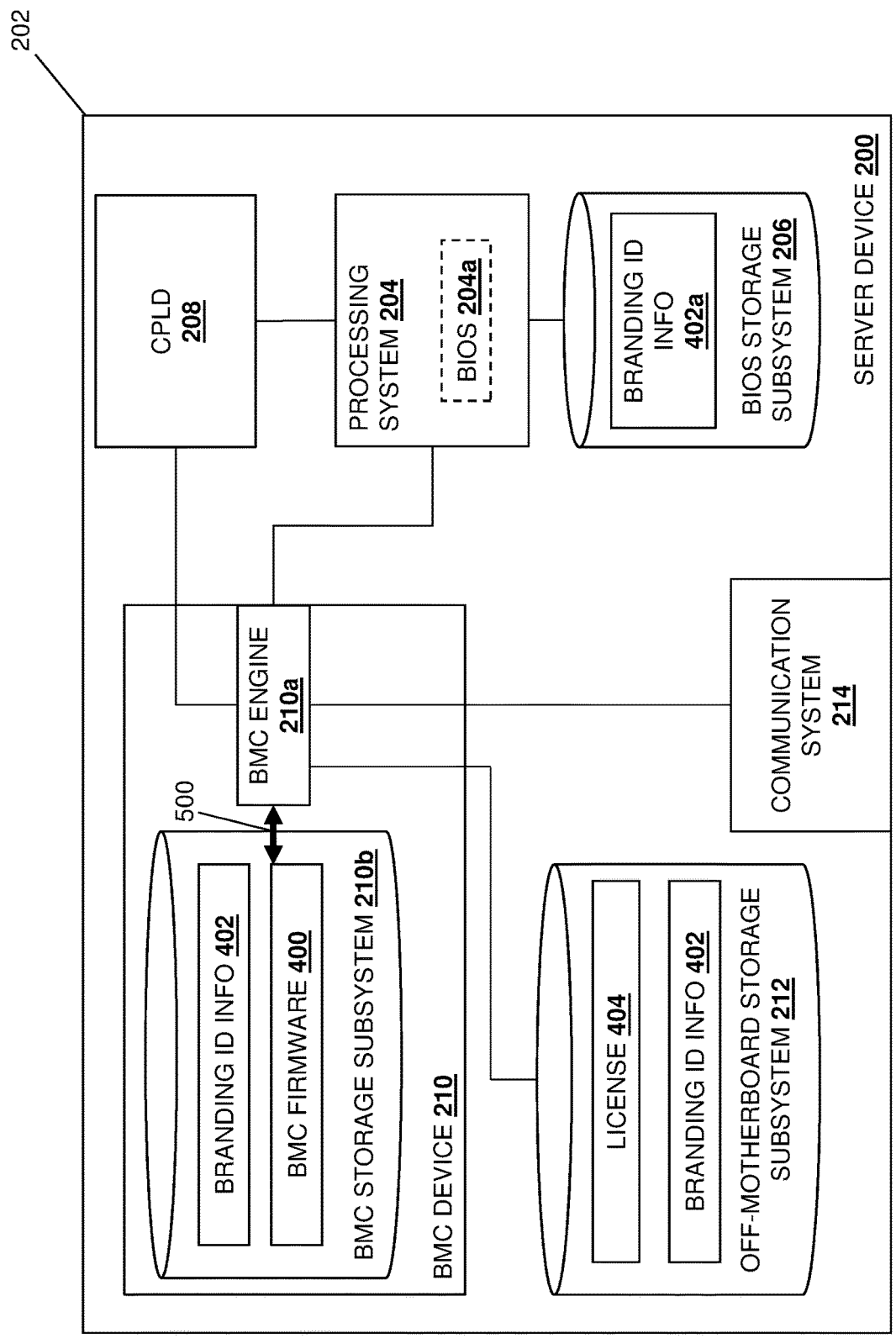
FIG. 5A is a schematic view illustrating an embodiment of the server device of FIG. 2 operating during the method of FIG. 3.
Figure 5B:
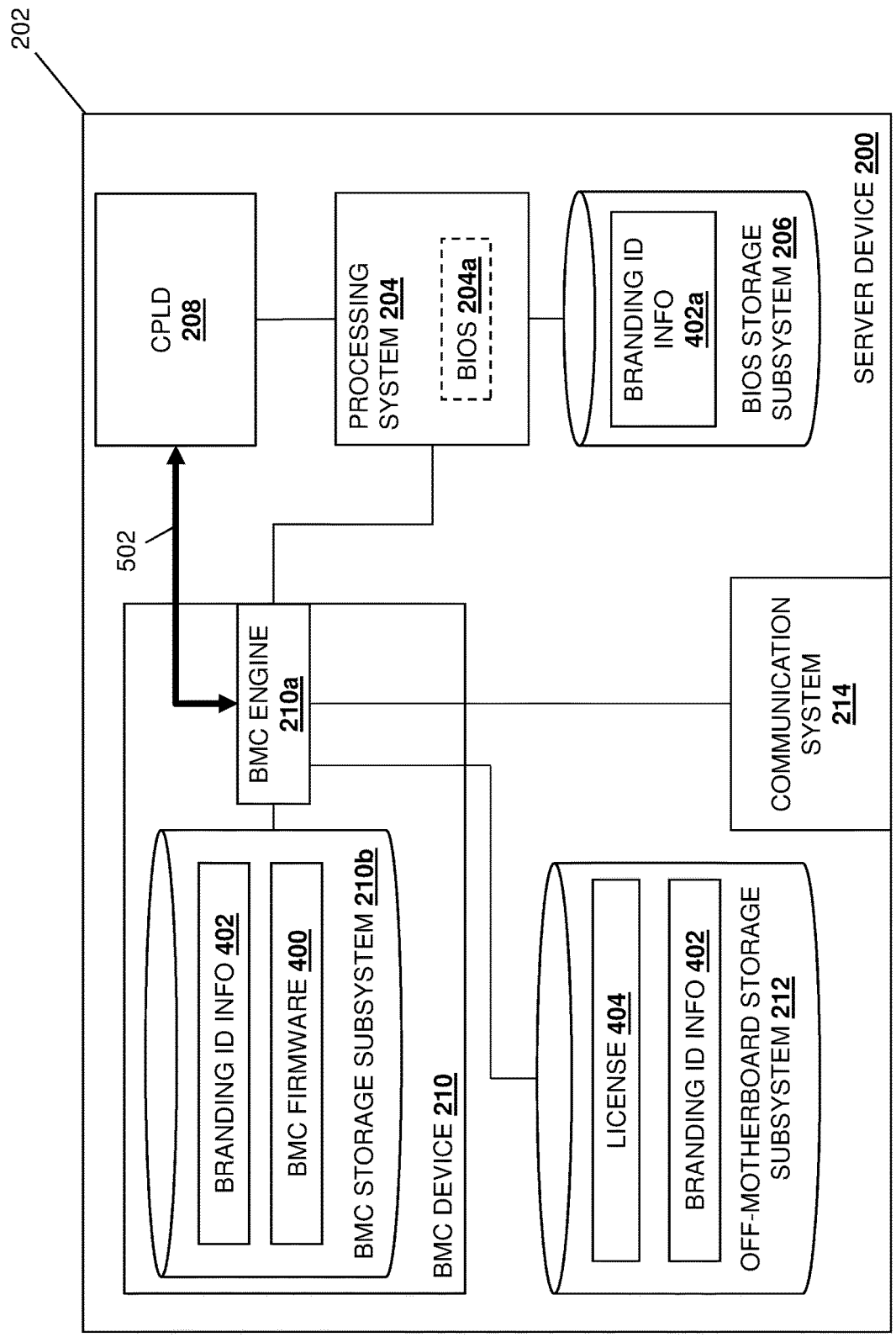
FIG. 5B is a schematic view illustrating an embodiment of the server device of FIG. 2 operating during the method of FIG. 3.

The method 300 then proceeds to block 304 where a BMC device initializes and retrieves a system identifier from a CPLD. With reference to FIG. 5A, in an embodiment of block 304, the BMC device 210 may be powered on, reset, rebooted, and/or otherwise initialized and, in response, the BMC engine 210a in the BMC device 210 may perform BMC firmware identification operations 500 that include identifying the BMC firmware 400 stored in the BMC storage subsystem 210b. With reference to FIG. 5B, the BMC engine 210a in the BMC device 210 may then perform system identifier identification operations 502 that include identifying a system identifier in the CPLD 208. For example, the CPLD 208 may include a non-volatile storage device in which the BIOS 204a may have previously written a system identifier such as, for example, a service tag for the server device 200 that uniquely identifies the server device 200 to the manufacturer (e.g., DELL®, Inc. in the examples above), and at block 304 the BMC engine 210a may read that non-volatile storage device to identify that server tag. However, while the identification of a specific system identifier is described, one of skill in the art in possession of the present disclosure will appreciate that a variety of system identifiers may be identified in a variety of locations at block 304 while remaining within the scope of the present disclosure as well.

Figure 5C:
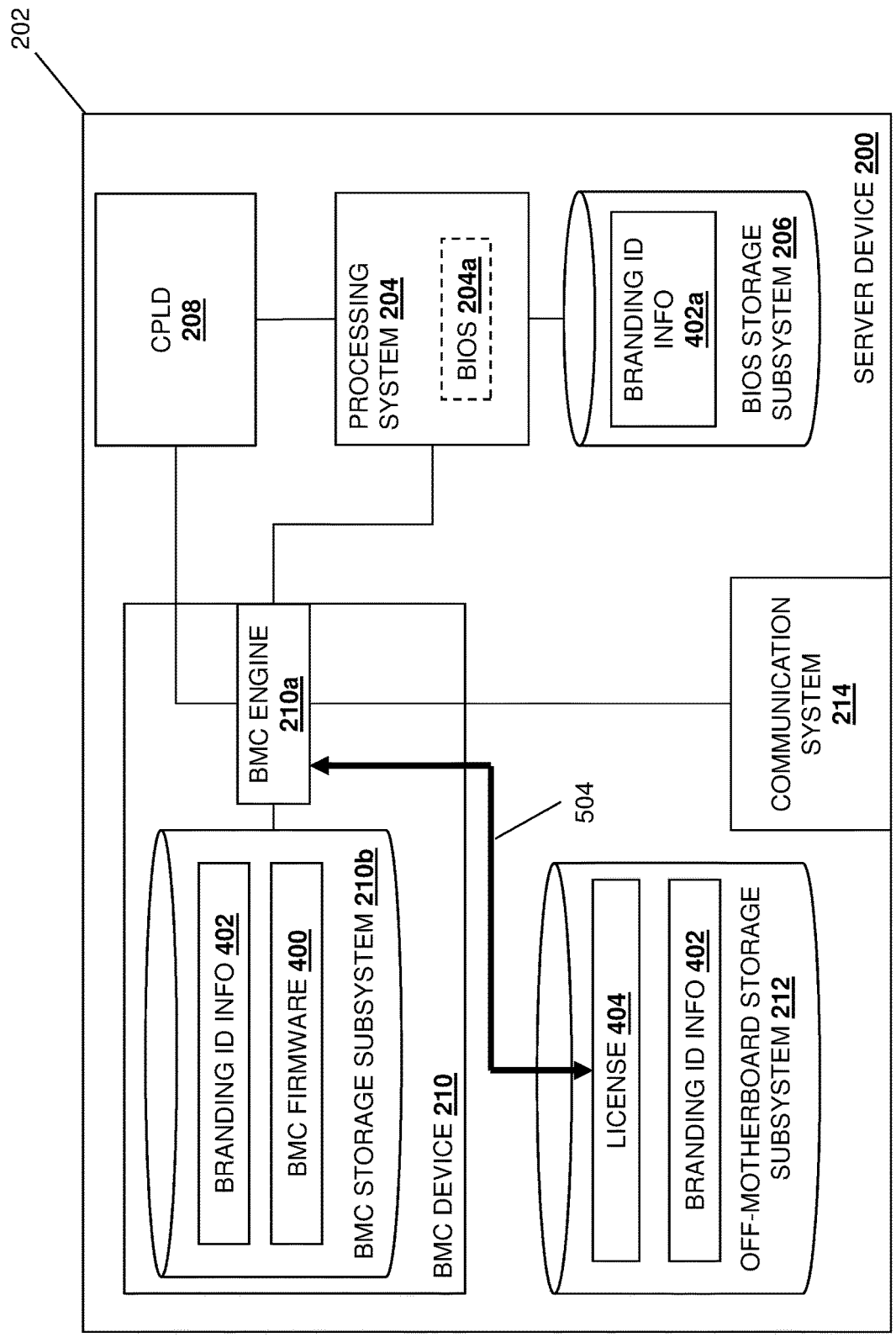
FIG. 5C is a schematic view illustrating an embodiment of the server device of FIG. 2 operating during the method of FIG. 3.
Figure 5D:
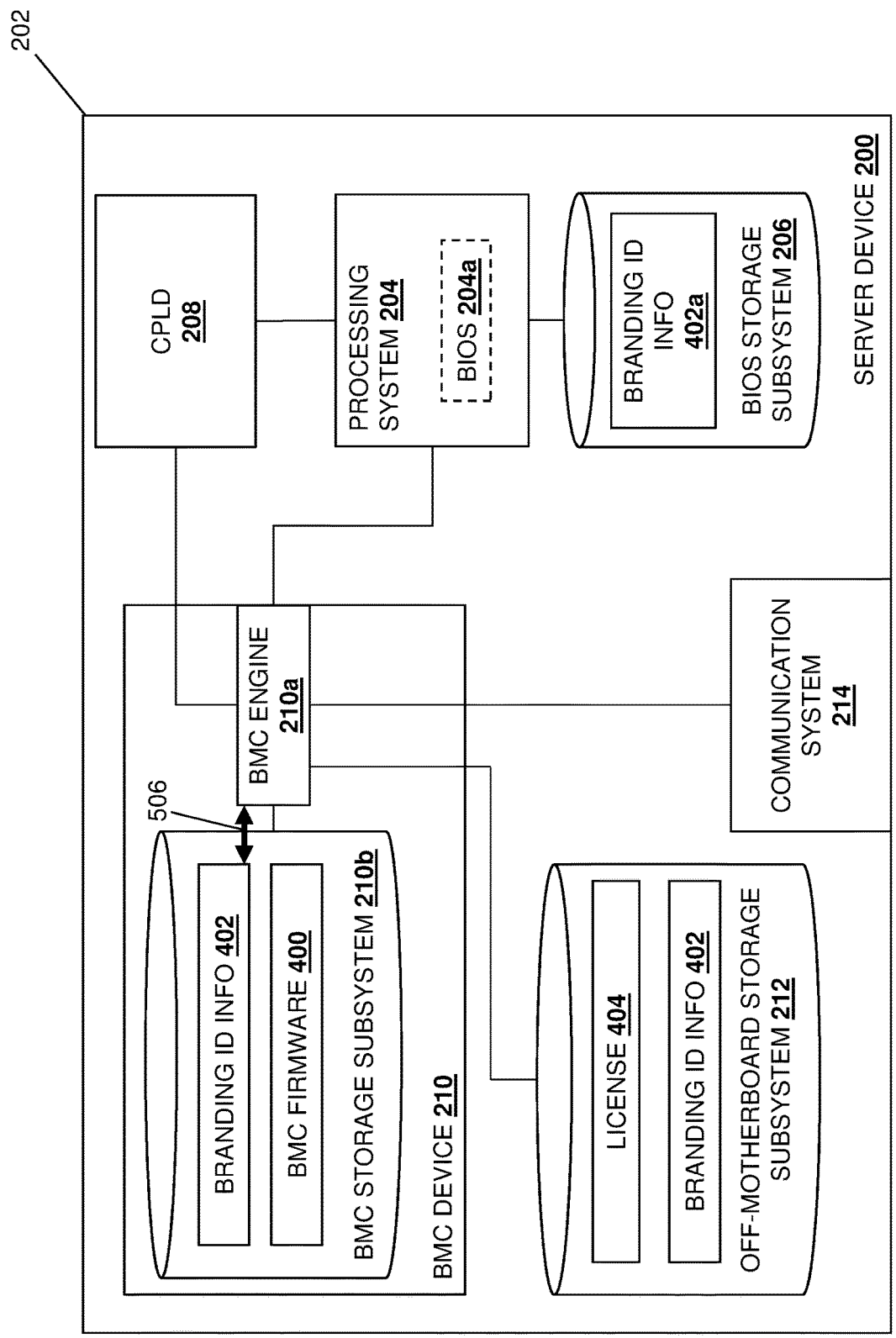
FIG. 5D is a schematic view illustrating an embodiment of the server device of FIG. 2 operating during the method of FIG. 3.

The method 300 then proceeds to decision block 306 where it is determined whether the license authorizes the BMC device to use the BMC firmware. With reference to FIG. 5C, in an embodiment of decision block 306, the BMC engine 210a in the BMC device 210 may perform license access operations 504 to access the license 404 in the off-motherboard storage subsystem 212 and in response, determine whether the license 404 authorizes the BMC device 210 to use the BMC firmware 400. For example, the license 404 may be configured to identify BMC firmware that the server device 200 (as identified by the system identifier (e.g., the service tag) retrieved at block 304) is licensed or otherwise authorized to have its BMC device 210 utilize in performing BMC initialization operations. As such, at decision block 306, the BMC engine 210a will access the license 404 and determine whether it identifies the BMC firmware 400 stored in the BMC storage subsystem 210b as licensed/authorized BMC firmware for use by the BMC device 210 in the server device 200 in performing BMC initialization operations.

If, at decision block 306, it is determined that the license does not authorize the BMC device to use the BMC firmware, the method 300 proceeds to block 308 where BMC device initialization is halted. In an embodiment, at block 308 and in response to determining that the license 404 does not identify the BMC firmware 400 stored in the BMC storage subsystem 210b as licensed/authorized BMC firmware for use by the BMC device 210 in the server device 200 in performing BMC initialization operations, the BMC engine 210a will halt BMC initialization operations. As such, in the event the BMC storage subsystem 210b is provided with BMC firmware that the BMC device 210/ server device 200 is not licensed/authorized to use in performing BMC initialization operations, the BMC device 210 will not be allowed to initialize, thus preventing non-licensed/authorized BMC firmware from being utilized in the BMC device 210. As will be appreciated by one of skill in the art in possession of the present disclosure, in response to halting BMC device initialization, the BMC engine 210a may provide a BMC initialization halted message for display (e.g., on a management system connected to the server device 200/BMC device 210 via a network) in order to inform a user about the inability to initialize the BMC device 210, and possibly recommend remedial operations.

Figure 5E:
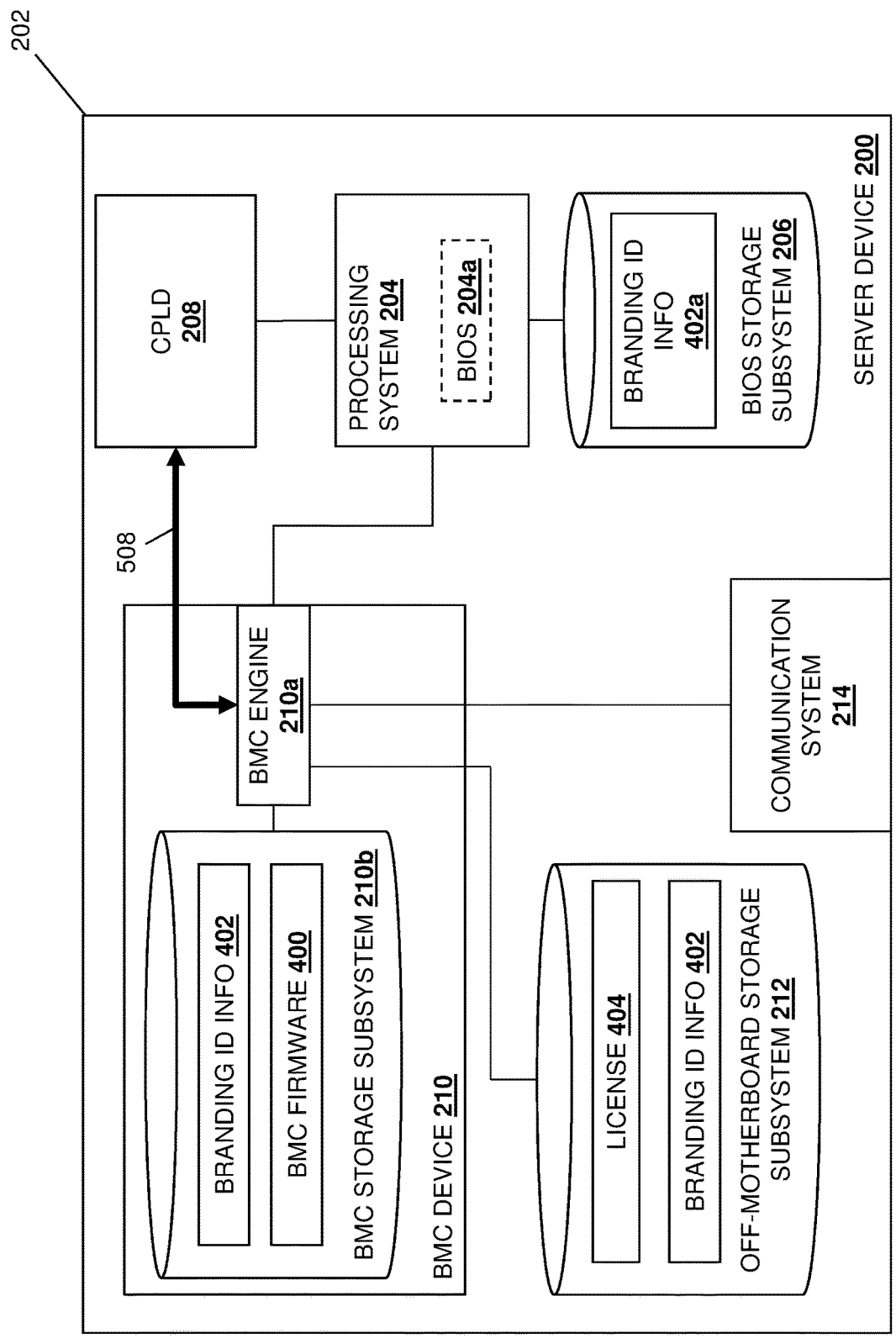
FIG. 5E is a schematic view illustrating an embodiment of the server device of FIG. 2 operating during the method of FIG. 3.

If at decision block 306, it is determined that the license authorizes the BMC device to use the BMC firmware, the method 300 proceeds to decision block 310 where it is determined whether the branding identity information is branded for the BMC firmware. With reference to FIG. 5E, in an embodiment of decision block 310 and in response to determining that the license 404 identifies the BMC firmware 400 stored in the BMC storage subsystem 210b as licensed/authorized BMC firmware for use by the BMC device 210 in the server device 200 in performing BMC initialization operations, the BMC engine 210a may perform branding identity information access operations 506 to access the branding identity information 402 stored in the BMC storage subsystem 210b and, in response, determine whether the branding identity information 402 provides for branding that is consistent with the BMC firmware 400. As discussed above, branding identity information may provide for the use of a variety of branding information such as particular system name strings, particular graphics, and/or a variety of other particular branding features that are specific to (and that identify) the BMC device 210/server device 200 when the BMC device 210 is configured with particular BMC firmware and, as such, the BMC engine 210a may determine at block 306 whether the branding identity information 402 provides the proper branding for the BMC device 210/server device 200 when the BMC device 210 is configured with the BMC firmware 400. Continuing with the specific example above, at block 306 the BMC engine 210a may determine whether the branding identity information 402 provides "iDRAC"/"POWEREDGE" branding for the BMC device 210/server device 200 when the BMC device 210 is configured with the "iDRAC"/BMC firmware 400 that is stored in the BMC storage subsystem 210b.

If, at decision block 306, it is determined that the branding identity information is not branded for the BMC firmware, the method 300 proceeds to block 312 where BMC device initialization is halted. In an embodiment, at block 312 and in response to determining that the branding identity information 402 is not branded for the BMC firmware 400 (i.e., it does not provide the proper branding for the BMC device 210/server device 200 when the BMC device 210 is configured with the BMC firmware 400), the BMC engine 210a will halt BMC initialization operations. Continuing with the specific example above, at block 306 the BMC engine 210a may determine that the branding identity information 402 provides "iDRAC"/"POWEREDGE" branding for the BMC device 210/server device 200 while "OpenBMC"/BMC firmware 400 is stored in the BMC storage subsystem 210b and, in response, will halt BMC initialization operations. As such, in the event the BMC storage subsystem 210b is provided with BMC firmware that the BMC device 210/ server device 200 is not branded to use, the BMC device 210 will not be allowed to initialize, thus preventing BMC firmware from being utilized in the BMC device 210/server device 200 when the BMC device 210/server device 200 are not branded to use that BMC firmware. As will be appreciated by one of skill in the art in possession of the present disclosure, in response to halting BMC device initialization, the BMC engine 210a may provide a BMC initialization halted message for display (e.g., on a management system connected to the server device 200/BMC device 210 via a network) in order to inform a user about the inability to initialize the BMC device 210, and possibly recommend remedial operations.

If at decision block 310, it is determined that the branding identity information is branded for the BMC firmware, the method 300 proceeds to decision block 314 where the method 300 proceeds based on whether the server device is initialized. Continuing with the specific example above, at block 306 the BMC engine 210a may determine that the branding identity information 402 provides "iDRAC"/ "POWEREDGE" branding for the BMC device 210/server device 200 and "iDRAC"/BMC firmware 400 is stored in the BMC storage subsystem 210b and, in response, the method 300 will proceed to block 314. As discussed in further detail below, the CPLD 208 may be programmed to identify BMC firmware that may be utilized in BMC initialization operations by the BMC device 210, and that programming may be performed by the BMC engine 210a (e.g., a U-boot subsystem provided by the BMC engine 210a) when the processing system 204/server device 200 has not yet initialized. As will be appreciated by one of skill in the art in possession of the present disclosure, the BMC device 210 may initialize independently from the processing system 204/server device 200, and thus at block 314 the method 300 may proceed based on whether the server device 200 is currently initialized.

In the event the server device is not initialized at decision block 314, the method 300 proceeds to block 316 where the BMC device programs the CPLD to identify the BMC firmware. With reference to FIG. 5E, in an embodiment of block 316, the BMC engine 210a in the BMC device 210 may perform CPLD programming operations 508 that include programming the CPLD 208 to identify the BMC firmware 400. For example, the CPLD 208 may include registers that may be configured to store "latches" or bits that may be used to indicate BMC firmware that may be utilized in BMC initialization operations by the BMC device 210, and thus at block 316 the BMC engine 210a in the BMC device 210 may program registers in the CPLD 208 to identify the BMC firmware 400 stored in the BMC storage subsystem 210b. Furthermore, the programming of the registers in the CPLD 208 by the BMC engine 210a in the BMC device 200 may be restricted to situations where the server device is not currently initialized, and thus following the initialization of the server device 200 as discussed below with regard to the method 600 and as long as that server device 200 is not powered down, the BMC engine 210a in the BMC device 200 may be prevented from reprogramming the registers in the CPLD 208. In a specific example, a U-boot subsystem provided by the BMC engine 210a may write the registers in the CPLD 208 at block 316 to identify the BMC firmware 400 stored in the BMC storage subsystem 210b, and may then "lock" those registers such that they cannot be changed via the BMC device 210 without powering down both the BMC device 210 and the server device 200 concurrently (e.g., such that the BMC engine 210a may be initialized and subsequently perform BMC initialization operations while the server device 200 is currently not initialized in order to perform block 316 of the method 300).

As such, one of skill in the art in possession of the present disclosure will recognize that the method 300 allows the BMC device 210/server device 200 to be reconfigured to utilize "new" BMC firmware by providing that "new" BMC firmware on the server device 200 (along with corresponding branded identity information and a corresponding license, as discussed above with reference to block 302) in place of the "current" BMC firmware, and then power-cycling or otherwise reinitializing the BMC device 210/server device 200 to cause the BMC engine 210a in the BMC device 210 to perform blocks 304, 306, 310 and 316 of the method 300 such that the BMC engine 210a in the BMC device 200 may reprogram the CPLD 208 to identify the "new" BMC firmware.

Figure 5F:
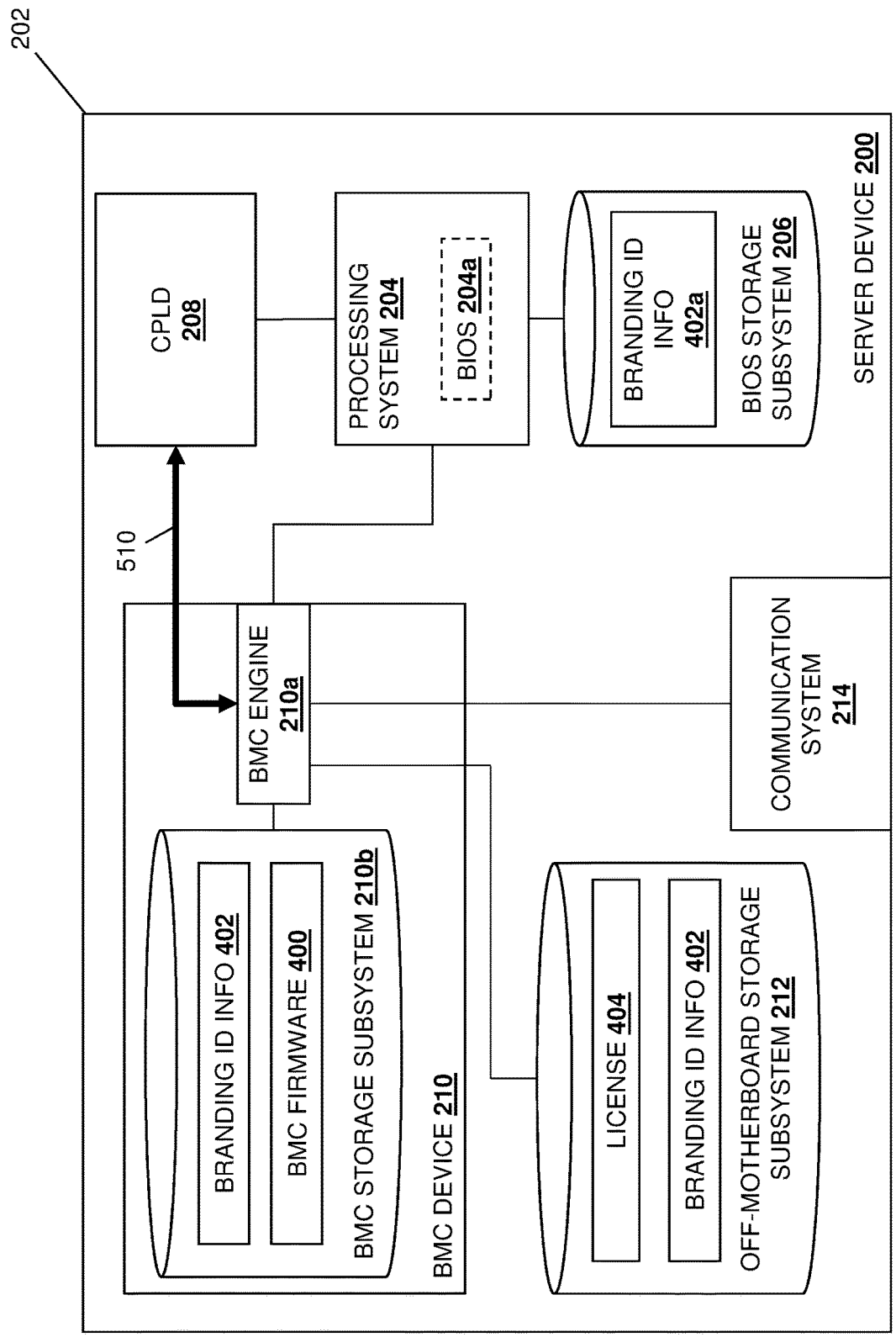
FIG. 5F is a schematic view illustrating an embodiment of the server device of FIG. 2 operating during the method of FIG. 3.

In the event the server device is initialized at decision block 314, or following the programming of the CPLD to identify the BMC firmware at block 316, the method 300 proceeds to decision block 318 where it is determined whether the CPLD is programmed to identify the BMC firmware. As will be appreciated by one of skill in the art in possession of the present disclosure, in the event decision block 318 immediately follows the BMC engine 210a in the BMC device 210 programming the CPLD 208 to identify the BMC firmware 400 at block 316, the method 500 may skip decision block 318 and proceed directly to block 322, discussed in further detail below. However, with reference to FIG. 5F, in the event the server device is initialized at decision block 314, at decision block 318 the BMC engine 210a in the BMC device 210 may perform CPLD access operations 508 to access the CPLD 208 and determine whether the CPLD is programmed to identify the BMC firmware 400. As such, at decision block 318 the BMC engine 210a in the BMC device 210 may determine whether "latches" or bits stored in registers in the CPLD 208 indicate that the BMC firmware 400 may be utilized in BMC initialization operations by the BMC device 210. Continuing with the specific example above, at block 318 the BMC engine 210a may determine whether CPLD 208 identifies the "iDRAC"/BMC firmware 400 stored in the BMC storage subsystem 210b.

If, at decision block 318, it is determined that the CPLD is not programmed to identify the BMC firmware, the method 300 proceeds to block 320 where BMC device initialization is halted. In an embodiment, at block 320 and in response to determining that the CPLD 208 does not identify the BMC firmware 400, the BMC engine 210a will halt BMC initialization operations. Continuing with the specific example above, at block 318 the BMC engine 210a may determine that the CPLD 208 identifies the "iDRAC" firmware while "OpenBMC"/BMC firmware 400 is stored in the BMC storage subsystem 210b and, in response, will halt BMC initialization operations. As such, in the event the BMC storage subsystem 210b is provided with BMC firmware that does not match the BMC firmware identified in the CPLD 208, the BMC device 210 will not be allowed to initialize, thus preventing BMC firmware from being utilized in the BMC device 210/server device 200 when the CPLD 208 identifies different BMC firmware. As will be appreciated by one of skill in the art in possession of the present disclosure, in response to halting BMC device initialization, the BMC engine 210a may provide a BMC initialization halted message for display (e.g., on a management system connected to the server device 200/BMC device 210 via a network) in order to inform a user about the inability to initialize the BMC device 210, and possibly recommend remedial operations If at decision block 318, it is determined that the CPLD is programmed to identify the BMC firmware, the method 300 proceeds to block 322 where the BMC device performs BMC initialization operations using the BMC firmware. Continuing with the specific example above, at block 318 the BMC engine 210a may determine that the CPLD 208 identifies the "iDRAC"/BMC firmware 400 that is stored in the BMC storage subsystem 210b and, in response, will utilize the "iDRAC"/BMC firmware 400 to perform BMC initialization operations. As will be appreciated by one of skill in the art in possession of the present disclosure, at block 322 the BMC engine 210a may utilize the BMC firmware 400 to perform a variety of BMC initialization operations known in the art. Furthermore, one of skill in the art in possession of the present disclosure will recognize that the completion of initialization operations by the BMC engine 210a in the BMC device 200 may include the BMC engine 210a communicating with the processing system 204 in order to initiate BIOS initialization operations.

Figure 6:
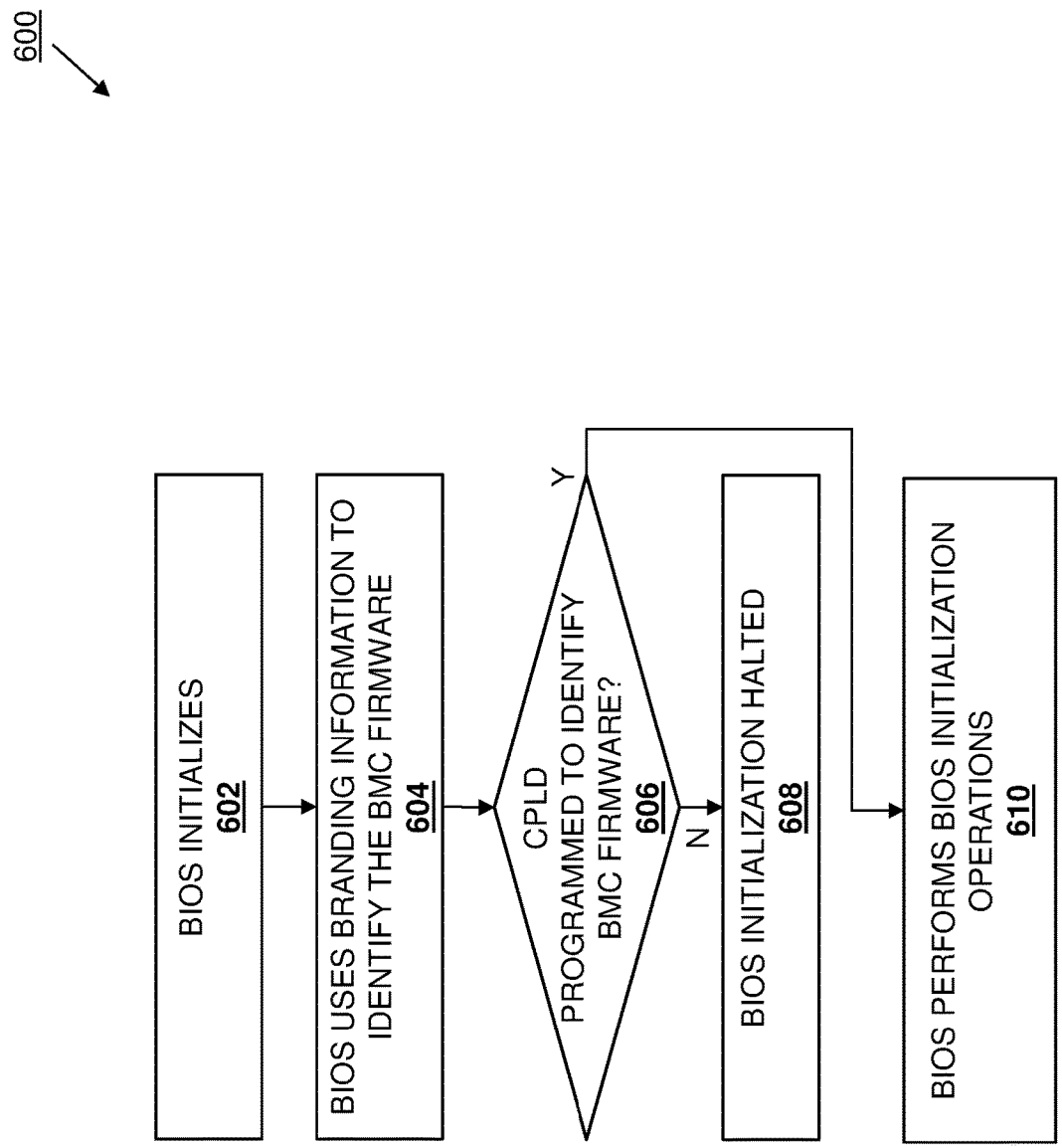
FIG. 6 is a flow chart illustrating an embodiment of a method for securing BMC firmware.

Referring now to FIG. 6, an embodiment of a method 600 for securing BMC firmware is illustrated. As discussed below, the systems and methods of the present disclosure provide for the establishment of a "circle of trust" between a BMC device, a CPLD, and a processing system in a server device in order to enable the secure utilization of different BMC firmware by the BMC device. For example, the BMC firmware security system of the present disclosure may include a BIOS is coupled to the CPLD and a second storage system. In response to BIOS initialization, the BIOS uses the branding identity information in the second storage subsystem to identify the BMC firmware, determines that the CPLD identifies the BMC firmware and, in response, performs BIOS initialization operations. As such, the BMC device may utilize different BMC firmware without running afoul of security requirements for the server device.

The method 600 begins at block 602 where a BIOS initializes. In an embodiment and as discussed above, the completion of initialization operations by the BMC engine 210a in the BMC device 200 may include the BMC engine 210a communicating with the processing system 204 in order to initiate BIOS initialization operations, and at block 602 the processing system 204 may be powered on, reset, rebooted, and/or otherwise initialized and, in response, the processing system 204 may operate to provide the BIOS 204a that may perform any of a variety of BIOS operations known in the art.

Figure 7A:
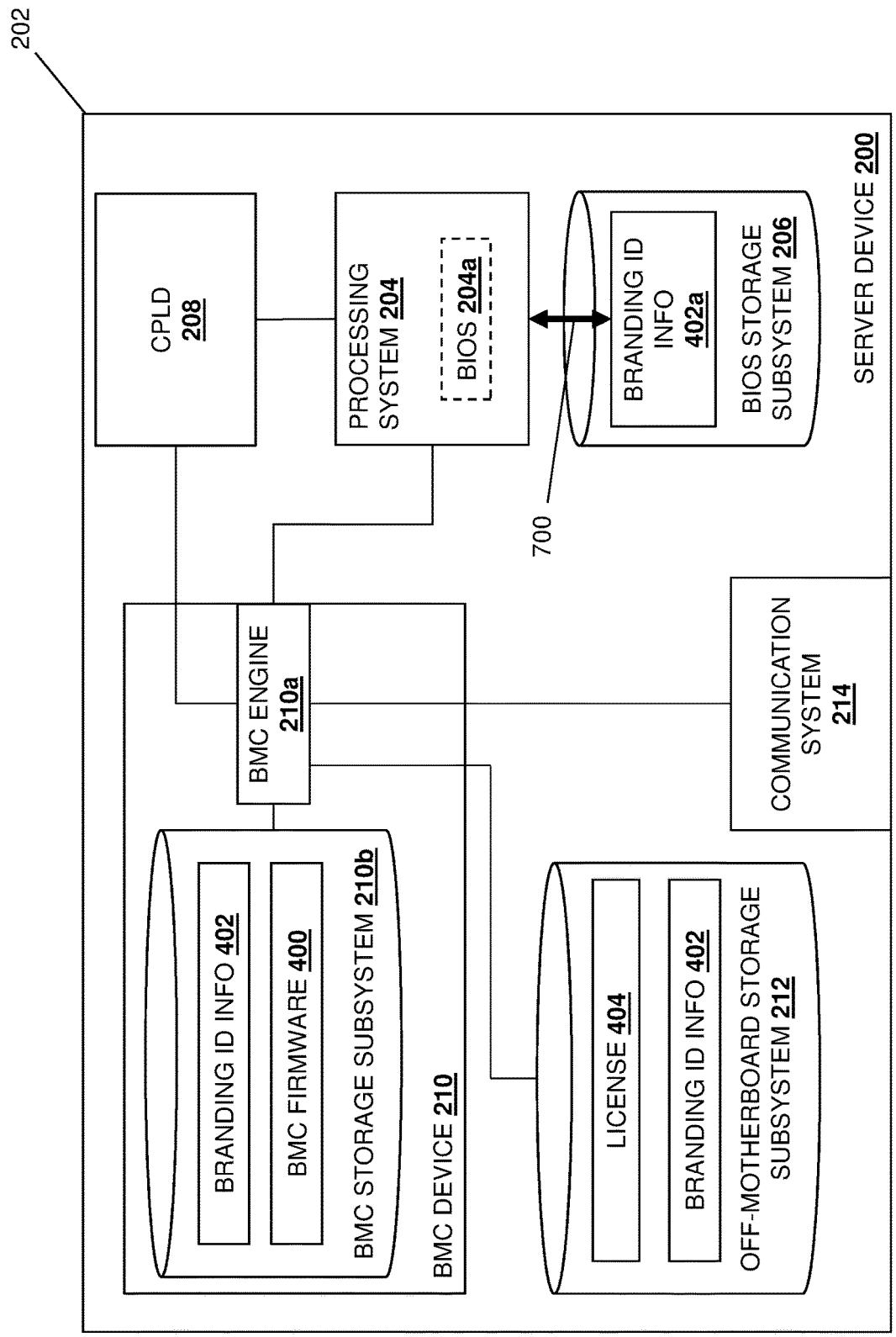
FIG. 7A is a schematic view illustrating an embodiment of the server device of FIG. 2 operating during the method of FIG. 6.

The method 600 then proceeds to block 604 the BIOS identifies the BMC firmware. With reference to FIG. 7A, in an embodiment of block 604 and in response to initialization of the BIOS 204a, the BIOS 204 may perform branding identity information identification operations 700 to identify the branding identity information subset 402a of the branding identity information 402 stored in the BIOS storage subsystem 206. As discussed above, branding identity information may provide for the use of a variety of branding information such as particular system name strings, particular graphics, and/or a variety of other particular branding features that are specific to (and that identify) the BMC device 210/server device 200 when the BMC device 210 is configured with particular BMC firmware and, as such, the BIOS 204a may use the branding identity information subset 402a of the branding identity information 402 at block 604 to identify the BMC firmware that the BMC device 210/server device 200 have been branded for. Continuing with the specific example above, at block 604 the BIOS 204a may determine that the branding identity information subset 402a of the branding identity information 402 stored in the BIOS storage subsystem 206 provides for the branding of the BMC device 210 as an "iDRAC", and for the branding of the server device 200 as part of a "POWEREDGE" server platform. As will be appreciated by one of skill in the art in possession of the present disclosure, the branding identity information subset 402a of the branding identity information 402 may be provided for use by the BIOS 204a (rather than the branding identity information 402) due to the BIOS 204a not requiring BMC-specific name-strings, graphics, and/or other branding information, and operates to conserve storage resources included in the BIOS storage subsystem 206 by only including branding information specific to and/or required by the BIOS 204a.

Figure 7B:
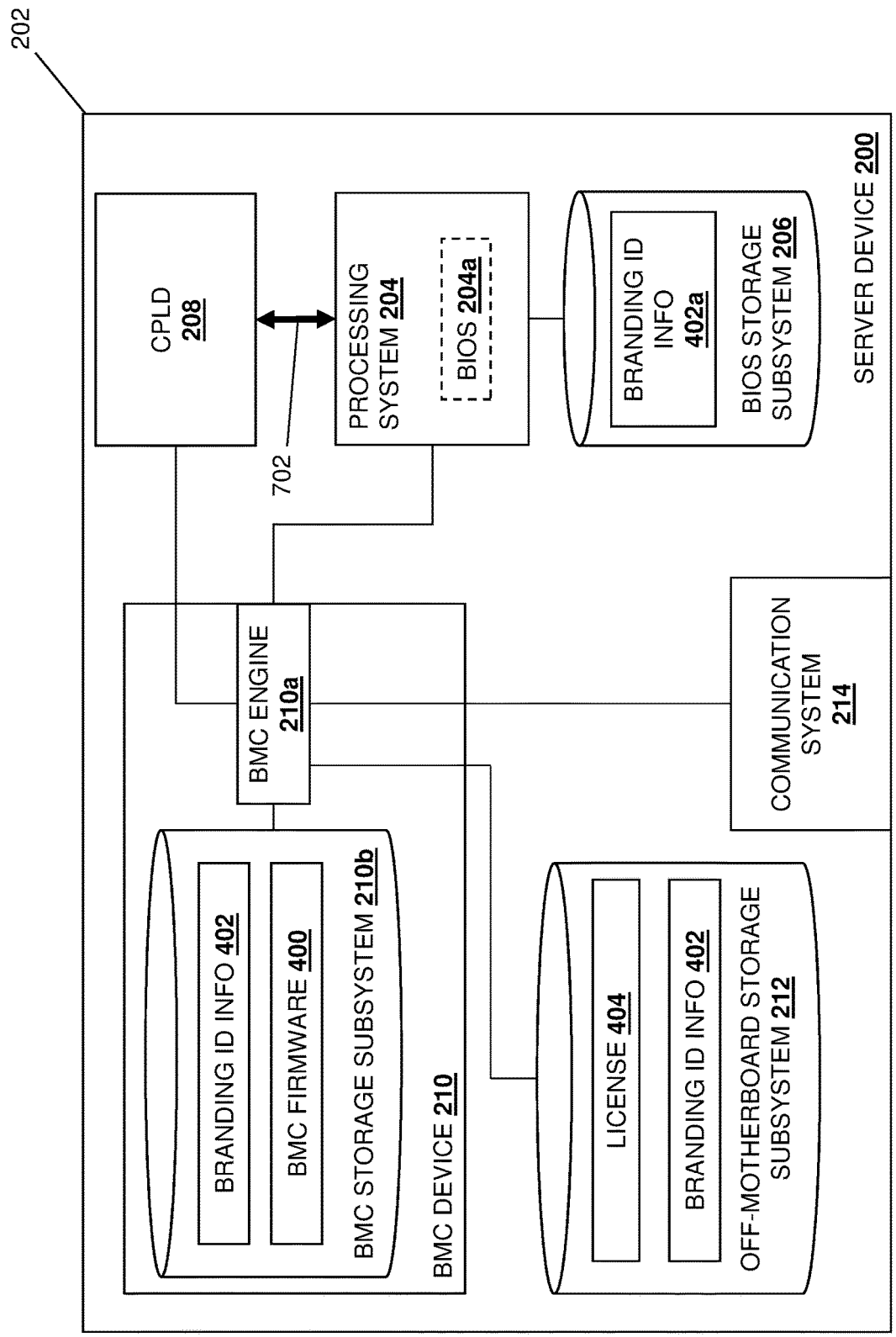
FIG. 7B is a schematic view illustrating an embodiment of the server device of FIG. 2 operating during the method of FIG. 6.

The method 600 proceeds to decision block 606 where it is determined whether the CPLD is programmed to identify the BMC firmware. With reference to FIG. 7B, in an embodiment of decision block 604, the BIOS 204a provided by the processing system 204 may perform CPLD access operations 702 to access the CPLD 208 and determine whether the CPLD is programmed to identify the BMC firmware 400 associated with the branding identity information subset 402a of the branding identity information 402 identified at block 604. As such, at decision block 606 the BIOS 204a provided by the processing system 204 may determine whether "latches" or bits stored in registers in the CPLD 208 identity BMC firmware that corresponds to the BMC firmware for which the BMC device 210/server device 200 are branded according to the branding identity information subset 402a of the branding identity information 402 stored in the BIOS storage subsystem 206. Continuing with the specific example above, at decision block 606 the BIOS 204a may determine whether CPLD 208 identifies the "iDRAC" firmware corresponding to the "iDRAC"/"POWEREDGE" branding provided by the branding identity information subset 402a of the branding identity information 402 stored in the BIOS storage subsystem 206.

If, at decision block 606, it is determined that the CPLD is not programmed to identify the BMC firmware, the method 600 proceeds to block 608 where BIOS initialization is halted. In an embodiment, at block 608 and in response to determining that the CPLD 208 does not identify the BMC firmware for which the BMC device 210/server device 200 are branded according to the branding identity information subset 402a of the branding identity information 402 stored in the BIOS storage subsystem 206, the BIOS 204a will halt BIOS initialization operations. Continuing with the specific example above, at decision block 606 the BIOS 204a may determine that the CPLD 208 identifies the "OpenBMC" firmware while the branding identity information subset 402a of the branding identity information 402 stored in the BIOS storage subsystem 206 provides "iDRAC"/"POWEREDGE" branding and, in response, will halt BIOS initialization operations. As such, in the event the CPLD 208 is programmed to identify BMC firmware for which the BMC device 210/server device are not branded (as per the branding identity information subset 402a of the branding identity information 402 stored in the BIOS storage subsystem 206), the BIOS 204a/processing system 204/server device 200 will not be allowed to initialize, thus preventing BMC firmware from being utilized in the BMC device 210 with the server device 200 when the CPLD 208 identifies BMC firmware for which the BMC device 210/server device 200 are not branded. As will be appreciated by one of skill in the art in possession of the present disclosure, in response to halting BIOS initialization, the BIOS 204a may provide a BIOS initialization halted message for display (e.g., on a management system connected to the server device 200/BMC device 210 via a network) in order to inform a user about the inability to initialize the BIOS 204a/processing system 204/server device 200, and possibly recommend remedial operations If at decision block 606, it is determined that the CPLD is programmed to identify the BMC firmware, the method 600 proceeds to block 610 where the BIOS performs BIOS initialization operations. Continuing with the specific example above, at decision block 606 the BIOS 204a may determine that the CPLD 208 identifies the "iDRAC" firmware while the branding identity information subset 402a of the branding identity information 402 stored in the BIOS storage subsystem 206 provides "iDRAC"/"POWEREDGE" branding and, in response, will perform BIOS initialization operations. As will be appreciated by one of skill in the art in possession of the present disclosure, at block 610 the BIOS 204a may perform a variety of BIOS initialization operations known in the art including, for example, configuring BMC branding information for the BMC device 210 and server branding information for the server device 200 in the System Management BIOS (SM- BIOS) or UEFI tables in a manner that is consistent with the branding identity information subset 402a and/or the branding identity information 402 (e.g., graphics on a BIOS F2 screen may be configured to display "POWEREDGE" or "CSP" names strings/graphics to identify platform branding depending on what BMC firmware (e.g., "iDRAC" firmware or "OpenBMC"/"DIY OpenBMC" in the examples above) was used to configure the BMC device). Furthermore, one of skill in the art in possession of the present disclosure will recognize that the completion of initialization operations by the BIOS 204a may include allowing the processing system 204 to provide an operating system that may operate in cooperation with the BMC device 210 during runtime operations for the server device 200.

Thus, systems and methods have been described that provide for the establishment of a "circle of trust" between a BMC device, a CPLD, and a processing system in a server device in order to enable the secure utilization of different BMC firmware by the BMC device. For example, the BMC firmware security system of the present disclosure may include a BIOS is coupled to the CPLD and a second storage system. In response to BIOS initialization, the BIOS uses the branding identity information in the second storage subsystem to identify the BMC firmware, determines that the CPLD identifies the BMC firmware and, in response, performs BIOS initialization operations. As will be appreciated by one of skill in the art in possession of the present disclosure, the BMC engine (e.g., U-boot), BIOS, and CPLD components in the BMC firmware security system of the present disclosure may all be signed by the manufacturer of the server device (e.g., DELL® Inc in the examples discussed above), which allows the operations according to the methods 300 and 600 to provide the "circle of trust" described above for BMC firmware. As such, the BMC device may utilize different BMC firmware without running afoul of security requirements for the server device Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Baseboard Management Controller (BMC) firmware security system, comprising:
  a programmable circuit device;
  a first storage subsystem; and
  a Baseboard Management Controller (BMC) device that is coupled to the programmable circuit device and the storage system, wherein the BMC device is configured, in response to a current BMC initialization of the BMC device, to:
    verify, using a system identifier, that a license stored in the first storage subsystem authorizes the BMC device to use BMC firmware stored in the BMC device;
    verify, using branding identity information stored in the BMC device, that the BMC device is branded for the BMC firmware;
    determine that the programmable circuit device has been programmed to identify the BMC firmware; and
    perform BMC initialization operations using the BMC firmware in response to verifying that the license authorizes the BMC device to use BMC firmware, verifying that the BMC device is branded for the BMC firmware, and determining that the programmable circuit device has been programmed to identify the BMC firmware.

2. The system of claim 1, wherein the BMC device is configured, in response to a previous BMC initialization of the BMC device that occurs prior to the current BMC initialization, to:
  receive the BMC firmware, the license, and the branding identity information;
  store the BMC firmware and the branding identity information in the BMC device;
  store the license in the first storage subsystem; and
  program the programmable circuit device to identify the BMC firmware.

3. The system of claim 2, wherein the first storage subsystem is an off-motherboard storage subsystem.

4. The system of claim 3, wherein the BMC device is configured, in response to the previous initialization of the BMC device, to:
  store the branding identity information in the first storage subsystem.

5. The system of claim 1, further comprising:
  a second storage subsystem; and
  a Basic Input Output System (BIOS) that is coupled to the second storage subsystem and the programmable circuit device, wherein the BIOS is configured, in response to a BIOS initialization, to:
    identify, using the branding identity information stored in the second storage subsystem, the BMC firmware;
    determine that the programmable circuit device has been programmed to identify the BMC firmware; and
    perform BIOS initialization operations in response to determining that the programmable circuit device has been programmed to identify the BMC firmware.

6. The system of claim 1, wherein the BMC device is configured, in response to the current BMC initialization of the BMC device, to:
  identify, in the programmable circuit device, the system identifier.

7. An Information Handling System (IHS), comprising:
  a Baseboard Management Controller (BMC) processing system; and
  a BMC memory system that is coupled to the BMC processing system and that includes instructions that, when executed by the BMC processing system, cause the BMC processing system to provide a BMC engine that is configured, in response to a current BMC initialization of the BMC engine, to:
    verify, using a system identifier, that a license stored in a first storage subsystem authorizes the BMC engine to use BMC firmware;
    verify, using branding identity information stored in a BMC storage subsystem, that the BMC engine is branded for the BMC firmware;
    determine that a programmable circuit device has been programmed to identify the BMC firmware; and
    perform BMC initialization operations using the BMC firmware in response to verifying that the license authorizes the BMC engine to use the BMC firmware, verifying that the BMC engine is branded for the BMC firmware, and determining that the programmable circuit device has been programmed to identify the BMC firmware.

8. The IHS of claim 7, wherein the BMC engine is configured, in response to a previous BMC initialization of the BMC engine that occurs prior to the current BMC initialization, to:
- receive the BMC firmware, the license, and the branding identity information;
- store the BMC firmware and the branding identity information in the BMC storage subsystem;
- store the license in the first storage subsystem; and
- program the programmable circuit device to identify the BMC firmware.

9. The IHS of claim 8, wherein the first storage subsystem is an off-motherboard storage subsystem.

10. The IHS of claim 9, wherein the BMC engine is configured, in response to the previous BMC initialization of the BMC engine, to:
- store the branding identity information in the first storage subsystem.

11. The IHS of claim 7, further comprising:
- a Basic Input Output System (BIOS) processing system; and
- a BIOS memory system that is coupled to the BIOS processing system and that includes instructions that, when executed by the BIOS processing system, cause the BIOS processing system to provide a BIOS that is configured, in response to a BIOS initialization, to:
  - verify, using the branding identity information stored in a second storage subsystem, that the BMC engine is branded for the BMC firmware;
  - determine that the programmable circuit device has been programmed to identify the BMC firmware; and
  - perform BIOS initialization operations in response to verifying that the BMC engine is branded for the BMC firmware and determining that the programmable circuit device has been programmed to identify the BMC firmware.

12. The IHS of claim 11, wherein the BIOS is configured, as part of the BIOS initialization operations, to
- provide the branding identity information associated with the BMC firmware for use by an operating system in branding the BMC engine.

13. The IHS of claim 7, wherein the BMC engine is configured, in response to the current BMC initialization of the BMC engine, to:
- identify, in the programmable circuit device, the system identifier.

14. A method for securing Baseboard Management Controller (BMC) firmware, comprising: detecting, by a BMC device, a current BMC initialization of the BMC device;
- verifying, by the BMC device in response to the current BMC initialization and using a system identifier, that a license stored in a first storage subsystem authorizes the BMC device to use BMC firmware;
- verifying, by the BMC device in response to the current BMC initialization and using branding identity information stored in the BMC device, that the BMC device is branded for the BMC firmware;
- determining, by the BMC device in response to the current BMC initialization, that a programmable circuit device has been programmed to identify the BMC firmware; and
- performing, by the BMC device in response to the current BMC initialization, BMC initialization operations using the BMC firmware in response to verifying that the license authorizes the BMC device to use BMC firmware, verifying that the BMC device is branded for the BMC firmware, and determining that the programmable circuit device has been programmed to identify the BMC firmware.

15. The method of claim 14, further comprising:
- receiving, by the BMC device in response to a previous BMC initialization that occurs prior to the current BMC initialization, the BMC firmware, the license, and the branding identity information;
- storing, by the BMC device in response to the previous BMC initialization, the BMC firmware and the branding identity information in the BMC device;
- storing, by the BMC device in response to the previous BMC initialization, the license in the first storage subsystem; and
- programming, by the BMC device in response to the previous BMC initialization, the programmable circuit device to identify the BMC firmware.

16. The method of claim 15, wherein the first storage subsystem is an off-motherboard storage subsystem.

17. The method of claim 16, further comprising:
- storing, by the BMC device in response to the previous BMC initialization, the branding identity information in the first storage subsystem.

18. The method of claim 14, further comprising:
- identifying, by a BIOS in response to a BIOS initialization and using the branding identity information stored in a second storage subsystem, the BMC firmware;
- determining, by the BIOS in response to the BIOS initialization, that the programmable circuit device has been programmed to identify the BMC firmware; and
- performing, by the BIOS in response to the BIOS initialization, BIOS initialization operations in response to determining that the programmable circuit device has been programmed to identify the BMC firmware.

19. The method of claim 18, further comprising:
- providing, by the BIOS as part of the BIOS initialization operations, branding information associated with the BMC firmware for use by an operating system in branding the BMC device.

20. The method of claim 14, further comprising:
- identifying, by the BMC device in response to the current BMC initialization and in the programmable circuit device, the system identifier.

* * * * *